May 17, 1960  N. W. ROSENBERG  2,937,126
ELECTRODIALYSIS DEMINERALIZATION
Filed Aug. 13, 1957

Inventor:
Norman W. Rosenberg
by
Aaron Tushin
Attorney

United States Patent Office 2,937,126
Patented May 17, 1960

2,937,126

ELECTRODIALYSIS DEMINERALIZATION

Norman W. Rosenberg, Newton, Mass., assignor to Ionics, Incorporated, Cambridge, Mass., a corporation of Massachusetts Application August 13, 1957, Serial No. 678,018

7 Claims. (Cl. 204—180)

This invention relates to the continuous removal of electrolytes from solutions and more specifically to the simultaneous concentration and dilution of two solutions in an electrodialysis cell. More particularly this invention comprises an improvement over known methods and apparatus for demineralizing solutions whereby the effluent stream from the concentrating chambers of an electrodialysis cell is circulated to the electrode compartments and a separate pump for the electrode compartment feed stream is thus eliminated.

Electrodialysis apparatus for the continuous demineralization of solutions have been disclosed in patent applications Ser. No. 300,302, filed July 22, 1952, now Patent No. 2,860,095, and Ser. No. 428,072, filed May 6, 1954, now Patent No. 2,848,403. Such apparatus utilizes an electrodialysis cell in which a direct electric current is used to continuously transfer ions from an influent solution through ion-selective permeable membranes into an adjoining chamber of the cell. By such a process the solution in one of said chambers is continuously diluted while the solution in the adjoining chamber is continuously concentrated. The chambers are separated by ion-selective permeable membranes which permit transfer of ions of one electric charge and bar the transfer of ions of the opposite charge. The demineralizing electrodialysis cell consists of a plurality of diluting chambers, in which one solution is diluted, alternately disposed between a plurality of concentrating chambers in which a second solution is concentrated, the separating permselective membranes, and the electrodes for the passage of direct current through the cell. Such electrodialysis apparatus for demineralizing or deionizing solutions may consist of any number of concentrating and diluting chambers, for example 100 of each, and two electrode chambers containing anode and cathode.

In modifying the concentrations of solutions in such an apparatus described above, it is well known to employ three feed systems for the circulation of liquids in the cell. For example, one pump and piping system feeds the diluting chambers and carries away the diluted solution for recirculation or exhaust. Similarly, a second pump and piping system feeds the concentrating chamber and carries away the concentrated solution for recirculation or exhaust. The third pump and piping system passes a feed stream through the anode and cathode chambers thereby continuously removing the products formed at the electrodes.

In patent application Ser. No. 428,072, filed May 6, 1954, it is disclosed that the streams from the three systems above can be recirculated in whole or in part to maintain equal pressure drops across the aforementioned membranes. In addition, the stream from the concentrating chamber can be recirculated in order to increase the concentration and reduce the fluid consumption of the cell.

Patent application Ser. No. 300,302, filed July 22, 1952, by Katz et al., discloses a method and apparatus for continuously and simultaneously concentrating and diluting two solutions of electrolytes whereby a plurality of diluting and concentrating chambers is employed and a part of the effluent from one set of chambers (concentrating or diluting) is passed through another set of chambers connected in series to further concentrate or dilute the solution. In this method the effluent stream from the chambers is not recirculated through the same chambers but is rather passed through another set of chambers for further transfer of electrolyte. In this apparatus, a separate system of feed and discharge for the electrode chambers was also used to remove the products formed at the electrodes.

It is readily apparent that in both methods and apparatus described above, whether streams are recirculated through the same chambers or a different set of chambers connected in series, that a separate pump and piping system for the electrode feed stream has been employed. In application Ser. No. 428,072 filed May 6, 1954, it is disclosed that the electrode feed may be continuously recirculated and that the pH of the cathode feed must be acid to prevent metal salt precipitation in the cathode chamber.

The maintenance of a separate pump and piping system for the electrode feed has several disadvantages which are eliminated by the present invention. If the feed stream to the electrodes is discharged without recirculation, the water consumption is prohibitive. Consequently it was common to recirculate the electrode feed stream continuously through an electrode feed pumping system. Recirculation of the liquid from the electrode compartments involves several difficulties which are expensive to overcome. For example in an apparatus for the demineralizing of sea water, chlorine and oxygen gases are formed at the anode and picked up by the anode feed stream. A gas trap was required to remove these corrosive gases before the anode feed could be recirculated. Also as mentioned, the addition of acid is necessary to maintain an acid pH in the cathode chamber; the acid further increased the corrosiveness of the electrode feed water. In addition to corrosion of pipes and pump, it was found that the gases in the feed water tended to cause the electrode feed pump to become gas bound.

The present invention envisions an improvement over the electrode feed system described above by eliminating the electrode feed pump and separate circulating system and by circulating a portion of the concentrate feed stream into the electrode compartments, adjusting the pH as necessary, and by discarding the electrode chamber discharge containing dissolved gases.

The advantages of such a method and apparatus for the electrode feed stream over the use of a separate electrode feed system in an electrodialysis cell are readily apparent. The initial capital investment in a deionizing unit is reduced by eliminating a pump. The unit is more reliable because there is no electrode feed system in which breakdowns or gas leaks can occur. Maintenance costs are thereby reduced. In addition the necessity of pumping, handling, and removing gases from the stream is obviated.

The object of this invention is to continuously remove the electrolytes from a solution in an electrodialysis more economically and efficiently than is possible by existing apparatus.

It is also an object of the invention to reduce maintenance and breakdowns in the pumping systems by eliminating the electrode feed pump.

This invention will be more fully understood from the following detailed description of representative embodiments of the invention wherein reference is made to the drawing in which.

Figure 1:
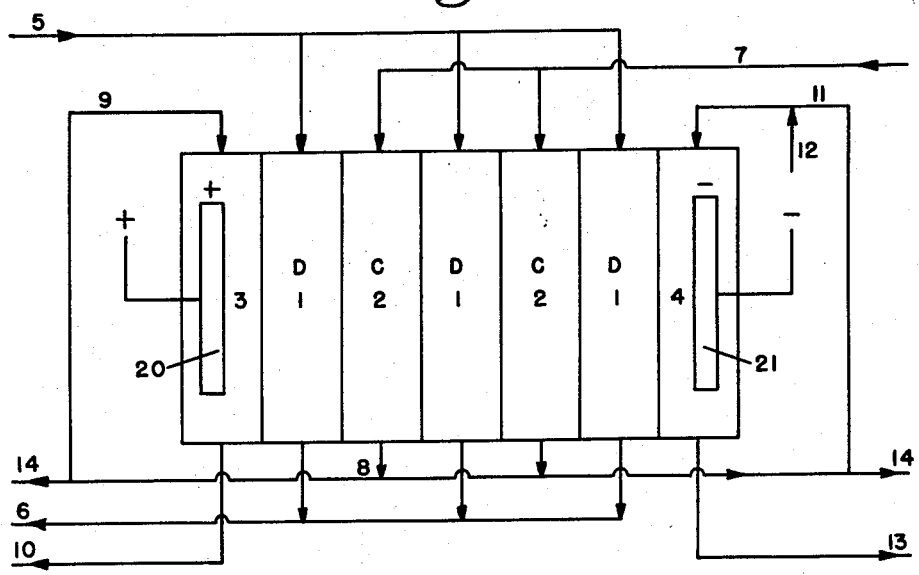
Figure 1 is a schematic representation of an electrodialysis cell in which a portion of the concentrate effluent is passed through the electrode chambers.

In the electrodialysis cell in Figure 1 diluting chambers 1 (D) are alternately disposed with concentrating chambers 2 (C). It is understood that a plurality of diluting and concentrating chambers may be used, for example 100 of each. The anode chamber 3 and the cathode chamber 4 contain the electrodes 20 and 21, respectively, for the passage of the direct current through the cell.

Separating the chambers are ion-selective permeable membranes, membranes selectively permeable to anion A and membranes selectively permeable to cations K. Permselective membranes of the type used in this apparatus may be prepared by methods disclosed in U.S. Patent No. 2,636,851 and U.S. Patent No. 2,730,768.

The solution to be diluted is introduced into the diluting chambers by the influent manifold 5 of the diluting circulatory system. The effluent solution fom the diluting chamber is withdrawn through manifold 6 to be passed through successive cells or removed from the unit, depending on the degree of dilution desired. The concentrating chambers are fed through influent manifold 7 while the concentrate effluent stream is drawn off through effluent manifold 8.

The anode feed stream 9 is taken off the concentrate effluent line 8 thereby eliminating a separate electrode pump. The anode effluent 10 is discarded because it contains free chlorine and oxygen gases formed at the electrode. The presence of these corrosive gases makes it undesirable to recirculate the discharge from the anode chamber.

The feed stream 11 for the cathode chamber is likewise taken from the concentrate effluent line 8, and acid is added by a line 12 from an acid proportionating pump (not shown). As outlined above, addition of acid may be necessary to prevent precipitation of salts in the cathode chamber. The acidic effluent 13 from the cathode is discarded as waste. The remaining portion of the concentrate effluent not passed through the electrode chambers is not recirculated but is discharged 14.

Figure 2:
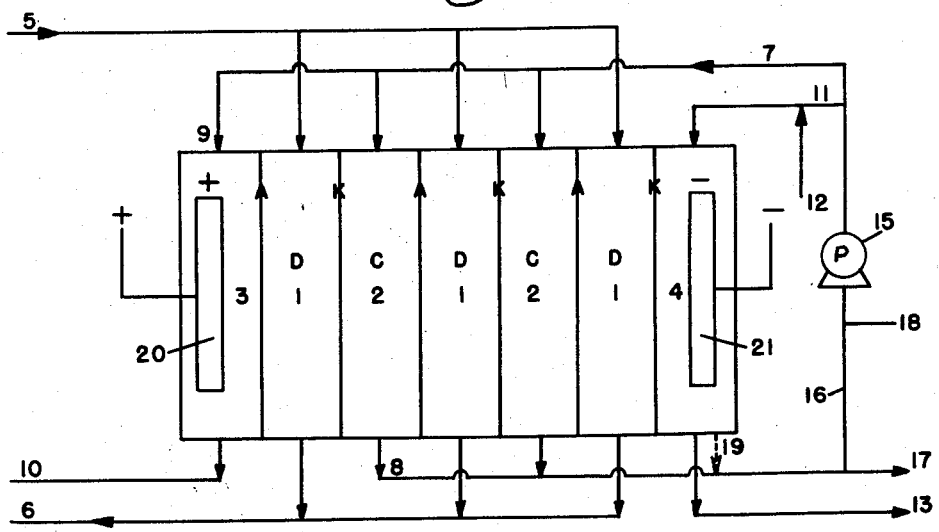
Figure 2 is a schematic representation of an electrodialysis cell which includes the system for recirculating the concentrate effluent while at the same time passing a portion of the concentrate effluent through the electrode chambers.

In Figure 2, the electrodialysis cell is in many respects the same as in Figure 1 with corresponding numbers. However in the cell illustrated schematically in Figure 2, the anode feed line 9 and the cathode feed line 11 are taken directly off of a concentrate recirculation pump 15. The concentrate effluent 8 is recirculated through conduit 16 through the circulating pump 15, waste being removed at 17 and raw feed water added continuously at 18. The effluent from the cathode chamber may be discarded at 13 as shown in Figure 1, or said effluent may be reinjected at 19 into the concentrate effluent stream to be recirculated.

The demineralization of naturally occurring brackish water will serve as an illustration of the operation of the apparatus described above, but it must be understood that the method and apparatus for electrode feed is not limited to brackish water but is applicable to any simultaneous concentration and dilution of solutions in an electrodialysis cell.

The brackish water to be demineralized is fed into the diluting chambers of the electrodialysis unit while the concentrate feed stream is pumped into the concentrating cells. Upon passing a direct current through the electrodes the ions from the brackish water are transferred through the permselective membranes into the adjoining concentrating chambers. The effluent stream from the concentrating chambers can be recirculated by means of a concentrate circulation pump, as shown in Figure 2, to economize on water consumption. A certain amount of the concentrate stream is continuously drawn off and discarded while raw feed water is continuously added to maintain constant flow. The amount of concentrate waste depends upon the initial salt concentration in the raw feed water. Where initial salt concentration, for example of $CaSO_4$, is high, a slight salt addition in the concentrating chambers will cause precipitation of the salt in the chambers or the lines and the amount of concentrate waste will be high. Depending on initial salinity of the feed water, concentrate waste may be 10% or greater of the total flow through the unit, or as low as 2%.

The principal embodiments of this invention are method and apparatus for utilization of a portion of the concentrate effluent stream for electrode feed. The anode chamber may be fed directly from the concentrate feed manifold if the concentrate effluent is recirculated or it may be fed off the concentrate effluent line if the concentrate effluent line is not recirculated. The effluent from the anode chamber contains chlorine and oxygen gases which would have great corrosive effect on pumps and piping if recirculated. Hence, the anode effluent is discarded as waste, comprising about 1% of the total liquid flow through the unit. The anode waste may be considered to be a portion of the concentrate wase mentioned above since it is removed from the concentrate circulating system.

The cathode chamber is fed from a line off the concentrate circulating pump or from the concentrate effluent stream to which feed line is connected a line from an acid proportionating pump. As pointed out, pH adjustment of the cathode feed is necessary to prevent precipitation of salts, for example $CaSO_4$, in the cathode chamber. If pH adjustment is necessary to prevent precipitation in the concentrating chambers, the concentrate feed stream will be sufficiently acid to prevent precipitation in the cathode chamber. The acidic effluent from the cathode chamber contains hydrogen gas formed at the cathode. The effluent is discarded because the gas in the liquid tends to bind the circulating pump, and the dissolved hydrogen may be dangerous as explosive if discharged with the concentrate waste. Anode and cathode effluents are combined and discarded separately because of their dissolved gases. The cathode effluent would also be discarded if acid adjustment of the concentrate feed is not desired. As in the case of the anode effluent, the volume of discharge from the cathode chamber is about 1% of the total flow in the unit and can be considered part of the concentrate waste. The cathode effluent can, however, exit into the concentrate recirculation system where acid adjustment of concentrate feed is desired.

It is also understood that the effluent from the concentrate chambers does not have to be recirculated but can be directly discharged if desired. In that case a portion of the concentrate effluent would be fed to the electrode chambers directly.

The following example will serve to illustrate the principles and use of this invention more fully but the invention is not limited thereto.

*Example 1*

A membrane demineralizer containing 150 diluting chambers 1 and 150 concentrating chambers 2 separated by selective membranes, and two electrode chambers 3 and 4 as shown in Figure 2 was used to treat a natural brackish water containing 1500 p.p.m. of $NaHCO_3$ and 500 p.p.m. of $MgCl_2$, and traces of other salts.

The brackish water was fed into the diluting chambers through a dilute feed system at 1200 gallons per hour. Brackish water was also fed into concentrating chambers and the electrode chambers through the concentrate circulation system. The effluent from the concentrating chambers was recirculated through the concentrate circulation pump 15. In continuous operation the concentrate circulation pump circulated the concentrate and electrode feed at a rate of 1200 gallons per hour at 20 p.s.i. Of this flow, 30 gallons per hour is fed to the cathode chamber, being mixed with 0.1 gallon per hour of 20% $H_2SO_4$; and 30 gallons per hour was fed to the anode chamber.

The effluent from the cathode chamber was reinjected into the circulating concentrate effluent stream where it served to maintain the pH at a value of 6.5. The anode effluent, at a rate of 30 gallons per hour, was discarded because of the corrosiveness of the dissolved chlorine and oxygen gases. In addition to the discharge of the anode effluent, 90 gallons per hour of concentrate effluent was discarded by conduit 17 in Figure 2. To make up for the total 120 gallons per hour discharge, 120 gallons per hour of raw feed water was added through conduit 18. In continuous operation, the total of 120 gallons per hour discharged from the concentrate circulation system (30 g.p.h. from the anode and 90 g.p.h. from the concentrate effluent) contained the entire amount of salt transferred from the diluting compartments plus the salt injected in the raw feed water. The natural brackish water was reduced in total salts from 2000 parts per million of $NaHCO_3$ and $MgCl_2$ to 500 parts per million at a rate of 1200 gallons per hour. The waste discharged from the concentrate effluent contained a total solids level of 17,000 parts per million. A direct current of 25 amperes at a voltage of 350 volts was used in operating the demineralizing unit.

Having thus disclosed my invention and described in detail representative and preferred embodiments thereof, I claim and desire to secure by Letters Patent:

1. The method of modifying the concentration of an electrolyte solution comprising passing a first feed stream from a common manifold through the diluting chambers of an electrodialysis unit having a plurality of diluting and concentrating chambers defined between ion-selective membranes and two end electrode chambers likewise separated from their adjacent chambers by ion-selective membranes, passing a second feed stream in parallel concurrent flow from a separate common manifold through the concentrating chambers, passing electrolytes through both electrode chambers, at least one of which electrolytes is a portion of the effluent from the concentrating chambers, recirculating at least a portion of the remaining effluent from the concentrate chambers back to the influent of the concentrate chambers, and passing a direct electric current through said chambers and membranes.

2. The method of claim 1 wherein a portion of the effluent from the concentrating chambers is passed through the anode chamber.

3. The method of claim 1 wherein a portion of the effluent from the concentrating chamber is acidified and then passed through the cathode chamber.

4. The method of claim 1 wherein a portion of the effluent from the concentrating chambers is passed through both electrode chambers.

5. The method of claim 1 wherein a portion of the effluent from the concentrating chambers is passed through the cathode chamber, and the effluent from the cathode chamber is recirculated with the effluent from the concentrate chambers.

6. Apparatus for modifying the concentration of electrolyte solutions in an electrodialysis unit comprising a plurality of concentrating and diluting chambers between two end electrode chambers, said chambers being separated by ion-selective membranes, means for continuously passing a feed stream from a common manifold through the diluting chambers, means for passing a second feed stream in parallel concurrent flow from a separate common manifold through the concentrating chambers, means for passing a portion of the effluent from the concentrating chambers through at least one electrode chamber, means for recirculating a portion of the remaining effluent from the concentrating chambers to the influent of said concentrating chambers, and means for passing a direct electric current transversely through all said chambers and membranes.

7. Apparatus for modifying the concentration of electrolyte solutions in an electrodialysis unit comprising a plurality of concentrating and diluting chambers between two end electrode chambers, said chambers being separated by ion-selective membranes, means for continuously passing a feed stream from a common manifold through the diluting chambers, means for passing a second feed stream in parallel concurrent flow from a separate common manifold through the concentrating chambers, means for acidifying a portion of the effluent from the concentrating chambers and passing the same into the influent of the cathode electrode chamber, means for recirculating a portion of the remaining effluent from the concentrating chambers to the influent of said concentrating chambers, and means for passing a direct electric current transversely through all said chambers and membranes.

References Cited in the file of this patent

UNITED STATES PATENTS

| 2,796,395 | Roberts | June 18, 1957 |
| 2,863,813 | Juda et al. | Dec. 9, 1958 |

FOREIGN PATENTS

| 682,703 | Great Britain | Nov. 12, 1952 |
| 750,500 | Great Britain | June 20, 1956 |
| 504,756 | Belgium | Aug. 8, 1951 |

OTHER REFERENCES

Langelier: Journal American, Water Works Assoc., September 1952, pp. 845–848.

Arnold et al.: The Industrial Chemist, July 1953, pp. 295–298.

Walters et al.: Industrial and Engineering Chemistry, vol. 47, No. 1, January 1955, pp. 61–66.